US008339915B2

(12) United States Patent
Kuijper et al.

(10) Patent No.: US 8,339,915 B2
(45) Date of Patent: Dec. 25, 2012

(54) FOCUS OPTIMIZATION ROUTINE WITH SUB-OPTIMAL JUMP SETTINGS IN OPTICAL DISC SYSTEMS

(75) Inventors: Maarten Kuijper, Eindhoven (NL); Stefan Geusens, Eindhoven (NL); Sung-Yao Lin, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

(21) Appl. No.: 12/376,299

(22) PCT Filed: Jul. 10, 2007

(86) PCT No.: PCT/IB2007/052741
§ 371 (c)(1),
(2), (4) Date: Feb. 4, 2009

(87) PCT Pub. No.: WO2008/015595
PCT Pub. Date: Feb. 7, 2008

(65) Prior Publication Data
US 2010/0157764 A1     Jun. 24, 2010

(30) Foreign Application Priority Data

Aug. 4, 2006   (EP) .................................. 06118433

(51) Int. Cl.
*G11B 5/55* (2006.01)
(52) U.S. Cl. ................ 369/53.28; 369/44.28; 369/53.11
(58) Field of Classification Search ............... 369/53.28, 369/53.11
See application file for complete search history.

(56) References Cited

U.S. PATENT DOCUMENTS

| 5,164,932 | A | 11/1992 | Fennema et al. |
| 5,504,726 | A | 4/1996 | Semba |
| 2004/0145978 | A1 | 7/2004 | Yamamoto |
| 2005/0180276 | A1 | 8/2005 | Watanabe et al. |
| 2005/0270916 | A1* | 12/2005 | Maeda .................... 369/44.25 |
| 2006/0104183 | A1* | 5/2006 | Kataoka et al. .......... 369/112.01 |
| 2006/0164949 | A1* | 7/2006 | Sagara et al. ................ 369/106 |

FOREIGN PATENT DOCUMENTS

| EP | 1136988 A2 | 9/2001 |
| EP | 1657714 A2 | 5/2006 |
| WO | 2005101387 A1 | 10/2005 |
| WO | 2006067675 A1 | 6/2006 |

OTHER PUBLICATIONS

The Written Opinion of the International Searching Authority, PCT/IB2007/052741.

* cited by examiner

*Primary Examiner* — Lixi C Simpson

(57) ABSTRACT

A method and system for obtaining focus optimization in an optical disc system is disclosed. The focus offset of a recording unit is set to a first of a plurality of predetermined values. A HF quality value is measured and stored for the selected focus offset value of the recording unit. The focus offset is then set to a best-known focus offset value. Tracks on the optical media being read are then jumped. The above steps are then repeated for each of the plurality of predetermined focus offset values. The optimal focus setting is then determined from the stored HF quality measurements.

20 Claims, 6 Drawing Sheets

FOCUS OPTIMIZATION ROUTINE WITH SUB-OPTIMAL JUMP SETTINGS IN OPTICAL DISC SYSTEMS

FIELD OF THE INVENTION

This invention pertains in general to the field of optical disc systems. More particularly the invention relates to a method and apparatus for an improved focus optimization routine with sub-optimal jump settings.

BACKGROUND OF THE INVENTION

Different formats of optical recording medium including read-only optical discs, such as CD (Compact Disk), and DVD (Digital Versatile Disc); and recordable optical discs such as a CD-R (Compact Disc-Recordable), CD-RW (Compact Disc-Rewritable) and DVD+RW (Digital Versatile Disc+Rewritable); and Blu-ray discs (BD) are well known. These optical recording media may be written and/or read out by means of an optical pick up unit or a read head in an optical scanning device. The optical pick up unit is mounted on a linear bearing for radially scanning across the tracks of the optical disc. The read head may comprise, among other elements, an actuator for focusing, radial tracking and tilting the lens. The optical scanning device comprises a light source such as a laser, which emits light that is focused onto the information layer in the disc. In addition to detecting and reading the information from the optical disc, the optical pick up unit also detects a variety of error signals, e.g., focus error and radial tracking error. These error signals are used by the optical scanning device to adjust various aspects of the scanning procedure to help reduce these errors. For example, the focus error signal can be used to determine how much the focus actuator should be steered to improve the focus of the laser.

For optimal read back and recording on an optical disc system, the focus set point for the optical scanning device needs to be calibrated. However, on empty media, no HF quality measurement, e.g. jitter, bit error rate, byte error rate, etc, is yet available for producing a focus versus HF quality measurement curve. Only after the first optimum power calibration (OPC) procedure can some tracks be written in the OPC zone that can then be used for servo calibrations.

Unfortunately, especially with a push-pull tracking method, the servo margins are very narrow. Before a sufficient wide focus offset versus HF quality measurement curve can be obtained, the radial tracking servo can frequently fail. The track loss results in a failed focus offset curve 10, which is illustrated in FIG. 1. In FIG. 1, the track loss occurs after only 4 jitter measurements have been made. As a result, a reliable optimal focus offset for read and record cannot be found.

Because of the limited availability of space in the OPC area, only a few tracks are written. To obtain enough jitter measurements, one or more tracks need to be measured for each focus offset point. For each focus measurement point, the same track is measured again. Therefore, track jumping is needed before each jitter measurement can take place. Two known focus offset calibration methods are illustrated in FIGS. 2-3. In FIG. 2, the sub-optimum focus is set in step 202. The jitter measurement is then performed in step 204. The focus offset is then set in step 206. The system then seeks/jumps to a new track in step 208. After the track jump, the jitter is measured again in step 204. This process continues, in step 210, until jitter samples have been collected for all of the focus offset points on each of the available tracks, where the process ends in step 212.

The focus offset calibration routine illustrated in FIG. 3 is similar to the calibration routine illustrated in FIG. 2, however in this case the focus offset is set prior to the jitter measurements. As illustrated in FIG. 3, the sub-optimum focus is set in step 302. Then the focus offset is set in step 304. The jitter measurement is then performed in step 306. The system then seeks/jumps to a new track in step 308. After the track jump, the focus offset is set in step 304. This process continues to loop, in step 310, until jitter samples have been collected for all of the focus offset points on each of the available tracks, where the process ends in step 312.

In both known focus offset calibration routines, the seek/jump takes place with a focus setting that is different from the sub-optimal position. Because the seek/jump takes place with a non-optimal focus offset, some serious radial error distortion may occur, as illustrated in FIG. 7, which causes radial track loss. This results in large servo instabilities which result in undesired radial recoveries, track loss, and increased start-up time.

Thus, there is a need for a method and apparatus for an improved focus optimization routine.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a system, a method, and a computer-readable medium for improving a focus optimization routine with sub-optimal jump settings in an optical disc system according to the appended patent claims.

According to one aspect of the invention, a method for obtaining focus optimization in an optical disc system is disclosed. The method comprises the steps of: setting focus offset of a recording unit to a first of a plurality of predetermined values; measuring and storing a HF quality value for the selected focus offset value of the recording unit; setting focus offset to a best-known focus offset value; jumping tracks on the optical media being read; repeating the above steps for each of said plurality of predetermined focus offset values; and determining optimal focus setting from said stored HF quality measurements.

According to one aspect of the invention, an optical disc system is disclosed. The system comprises: a recording unit for performing an optical scanning operation on an optical media; a control system for obtaining focus optimization for the recording unit, wherein the control system performs the following steps: setting focus offset of the recording unit to a first of a plurality of predetermined values; measuring and storing a HF quality value for the selected focus offset value of the recording unit; setting focus offset to a best-known focus offset value; jumping tracks on the optical media being read; repeating the above steps for each of said plurality of predetermined focus offset values; and determining optimal focus setting from said stored HF quality measurements.

According to a further aspect of the invention, a computer-readable medium having embodied thereon a computer program for obtaining focus optimization in an optical disc system, for processing by a computer is provided. The computer program comprises a code segment for setting focus offset of a recording unit to a first of a plurality of predetermined values; a code segment for measuring and storing a HF quality value for the selected focus offset value of the recording unit; a code segment for setting focus offset to a best-known focus offset value; a code segment for jumping tracks on the optical media being read; a code segment for repeating the above steps for each of said plurality of predetermined focus offset values; and a code segment for determining optimal focus setting from said stored HF quality measurements.

The present invention has for instance the advantage over the prior art that it produces more accurate focus optimization routine.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

The following description focuses on an embodiment of the present invention applicable to focus optimization in an optical disc system. However, it will be appreciated that the invention is not limited to this application but may be applied to other systems.

Figure 4:
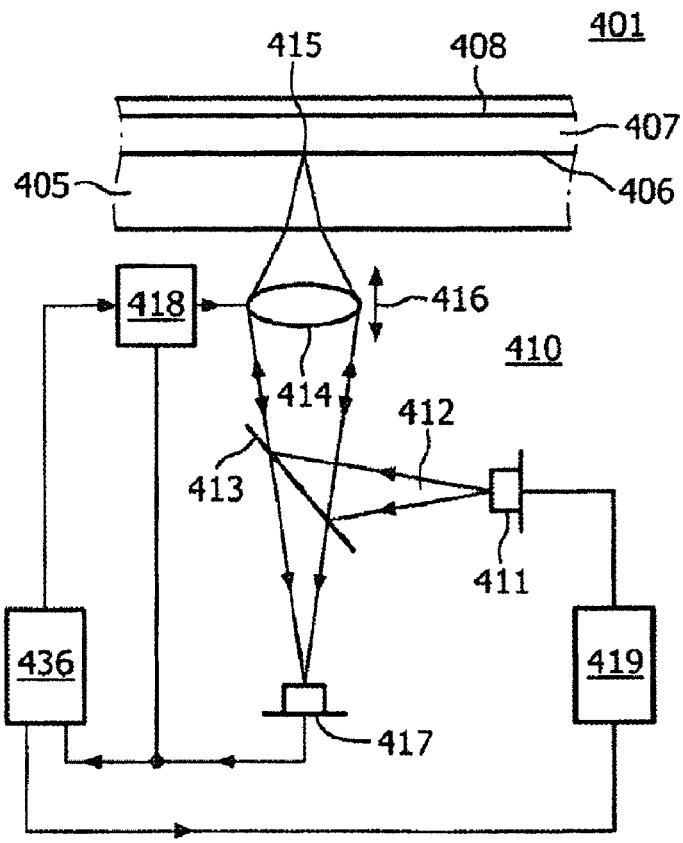
FIG. 4 is a block diagram of an optical disc system according to one embodiment of the invention.

FIG. 4 shows a cross-section of a dual layer optical disc 401 and a recording unit 410 for performing an optical scanning operation as to write information into the optical disc 401. The optical disc 401 has a transparent substrate 405 provided with a first information layer 406 and a second information layer 408 arranged substantially parallel thereto and separated by a transparent spacer layer 407. Although only two information layers are illustrated in this embodiment of the optical disc 401, the number of information layers may be more than two. The recording unit 410 comprises a radiation source 411, for example a diode laser, which generates a radiation beam 412 with a predetermined recording or writing power. The radiation beam is formed to a focusing spot 415 via a beam splitter 413, for example, a semi-transparent plate, and a lens system 414, for example, an objective lens. The focusing spot 415 can be placed on any desired information layer by moving the objective lens 414 along its optical axis, as is denoted by the arrow 416. Since the first information layer 406 is partially transmissive, the radiation beam can be focused through this layer on the second information layer 408. By rotating the optical disc 401 about its center and displacing the focusing spot in a direction perpendicular to the tracks in the plane of the information layer, enables the entire area of an information layer to be scanned by the focusing spot during a writing or reading operation. The radiation reflected by an information layer is modulated by the stored information into, for example, intensity or direction of polarization. The reflected radiation is guided by the objective lens 414 and the beam splitter 413 towards a detection system 417 that converts the incident radiation into one or more electrical signals. One of the signals, that is the information signal, has a modulation which is related to the modulation of the reflected radiation, so that this signal represents the information which has been read. Other electric signals indicate the position of the focusing spot 415 with respect to the track to be read and the position, i.e., the angular and the radial position, of the focusing spot 415 on the record carrier. The latter signals are applied to a servo system 418 which controls the position of the objective lens 414 and hence the position of the focusing spot in the plane of the information layers and perpendicular thereto in such a way that the focusing spot 415 follows the desired track in the plane of the information layer to be scanned. A control unit 436 is provided to control the servo system 418 and the writing power applied to the radiation source 411 on the basis of a level of the reflected light signal detected by the detection system. The control of the writing power may be performed by feedback via a driving unit 419 to the radiation source 411. The control unit 436 operates in accordance with a control program which controls the recording unit 410 so as to achieve a proper recording on the information layers. In particular, a focus calibration procedure, such as an initial OPC procedure for setting an initial optimum focus calibration routine may be provided as described below.

In the present invention, HF quality measurements are made and used in the focus optimization routine. While the following embodiments will describe the use of jitter measurements, the invention is not limited thereto. The invention contemplates the use of any HF quality measurements such as, but not limited to, jitter measurements, bit error rate measurements, symbol error measurements, byte error rate measurements, or Partial Response Maximum Likelihood (PRML) sample amplitude modulation measurements. The control system 436 and the recording unit 410 include the necessary devices and software to make and use any of the above-described HF quality measurements. For example, the optical system 400 may include a Viterbi PRML detector from which a symbol error rate, or a sample amplitude modulation measurement (or other quality measurements) can be determined.

Figure 5:
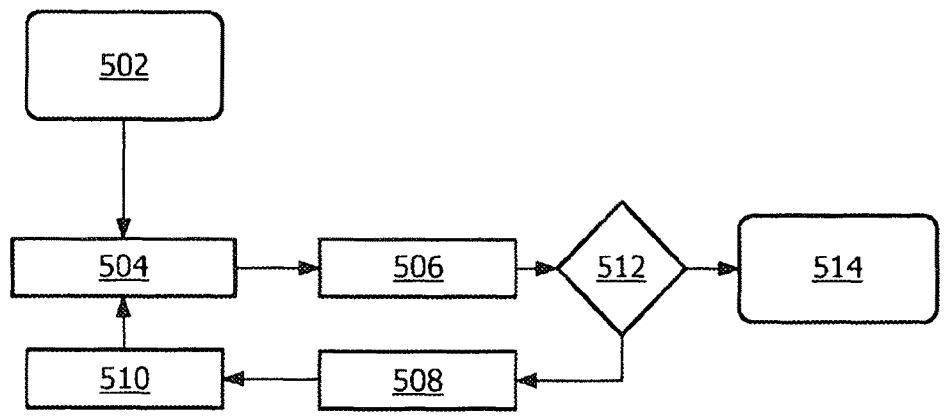
FIG. 5 is a flow chart of the improved focus optimization routine according to one embodiment of the invention.

FIG. 5 is a flow chart illustrating a focus optimization routine according to one embodiment of the invention. The sub-optimum focus is set in step 502. Then the focus offset is set in step 504. A HF quality measurement such as a jitter measurement is then performed in step 506. Jitter is a quality measure of the read out signal. Jitter is the deviation of the zero crossings of the sliced HF signal relative to a PLL clock running at the same HF signal. With high jitter, bit decision errors might occur as a particular run length can be mistakenly judged too long or too short. In this embodiment, the focus is now set in step 508 to the best-known offset value before the seek/jump occurs. The presetting of the focus to the best-known value makes the track jumping much more robust. The preset value is a sub-optimal point from the servo and HF point of view. This known focus offset is for example learned by the control system 436 from previous optimization routines and stored in the memory of the optical disc system.

Alternatively, the sub-optimal values may be found using another type of focus calibration routine during start-up, like a push-pull or wobble amplitude measurement. The push-pull and wobble amplitude are maximum at a focus offset value that is close to the optimal focus offset value. During disc start-up, the wobble amplitude measurement is used with the radial tracking loop opened. The wobble or push-pull amplitude is measured for several focus offset values to determine the focus offset with the largest push pull amplitude. The push-pull or wobble method does not require HF or recorded data on the disc. It works fine on empty discs. By opening the radial loop, the loop is quite robust. That optimum is in general not accurate enough for readout of data or recording. However, these sub-optimal offset values may be used in the present invention as described below.

Once the best-known sub-optimal offset value has been selected in step 508, the recording unit 410 performs a seek/jump to a different track in step 510. After the seek/jump, the required focus offset is set in step 504 just before the actual jitter measurement takes place. The focus actuator is fast, typically with several kHz bandwidth. This makes the necessary idle time to stabilize the system between the end of the seek/jump and the measurement area short, typically less than one millisecond. This process continues, in step 512, until jitter samples have been collected for all of the focus offset points on each of the available tracks, where the process ends in step 314.

Figure 1:
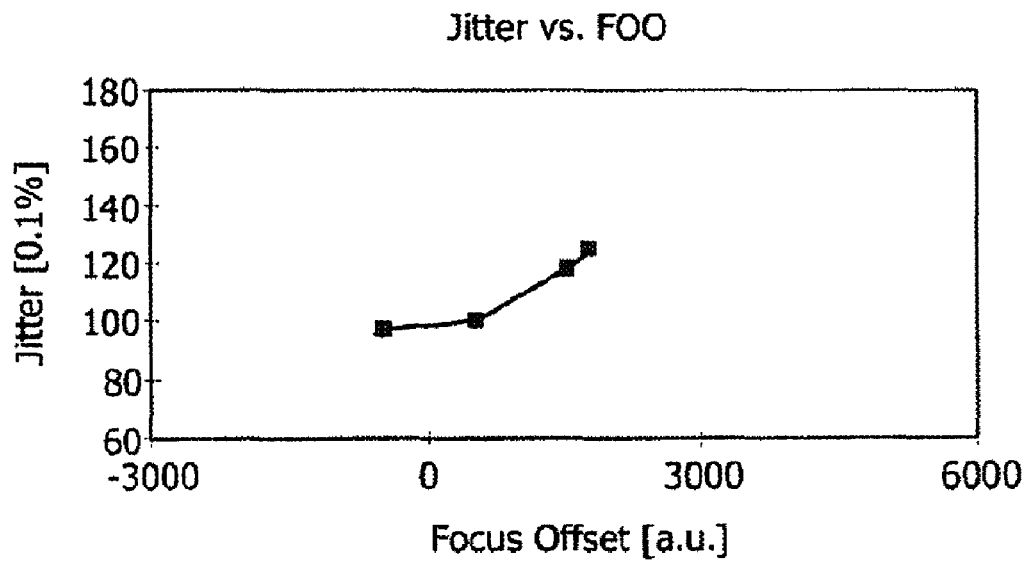
FIG. 1 is a graph of a jitter versus focus offset curve obtained using a known focus offset calibration routine.
Figure 6:
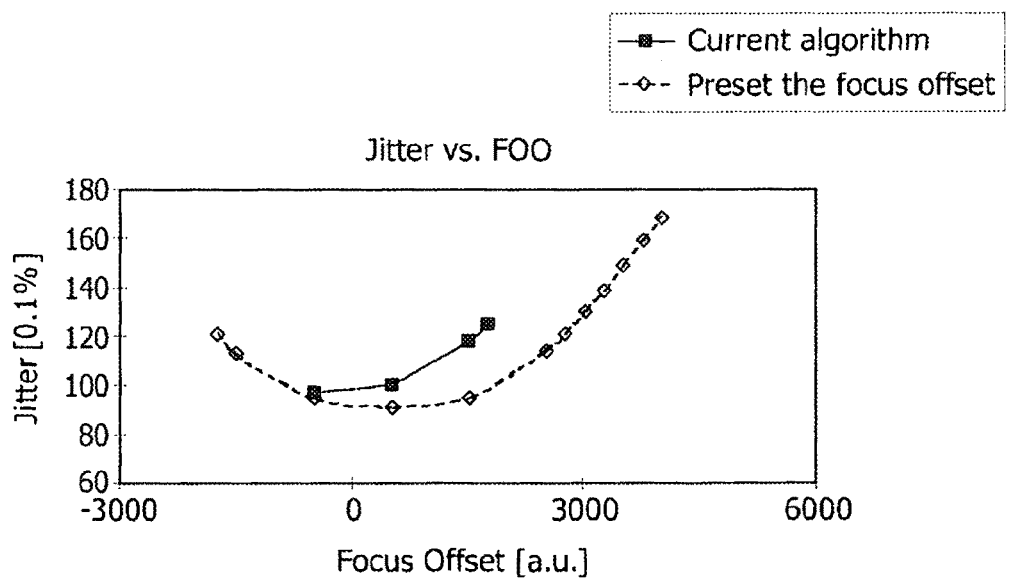
FIG. 6 is a graph of a jitter versus focus offset curve obtained using the improved focus optimization calibration routine according to one embodiment of the invention.

For each focus offset setting FOC[n], the jitter is measured and stored in an array JIT[x]. The focus offset is changed from the nominal focus offset point FOC[0] in the decreasing direction FOC[-1, . . . , -x] until the jitter has increased sufficiently. For example, when the jitter has increased +2% or when the jitter reaches the boundary of +16%, the measurement in that decreasing focus offset direction is stopped. Next the focus offset is changed from the nominal focus offset in the increasing direction FOC[+1, . . . , +x] until the same jitter criteria are met. FIG. 6 illustrates a graph of a jitter versus focus offset curve obtained using the improved focus optimization calibration routine according to one embodiment of the invention. As compared with the graph illustrated in FIG. 1, a much more detail jitter curve is produced. With a second order fit on the two arrays FOC[n]=x axis and JIT[n] =y axis, the optimum focus offset is found. Because servo stability is now significantly improved, a much wider focus offset sweep can be obtained. The final focus offset is set to FOC[opt] and can be stored in the memory of the optical disc system.

Figure 2:
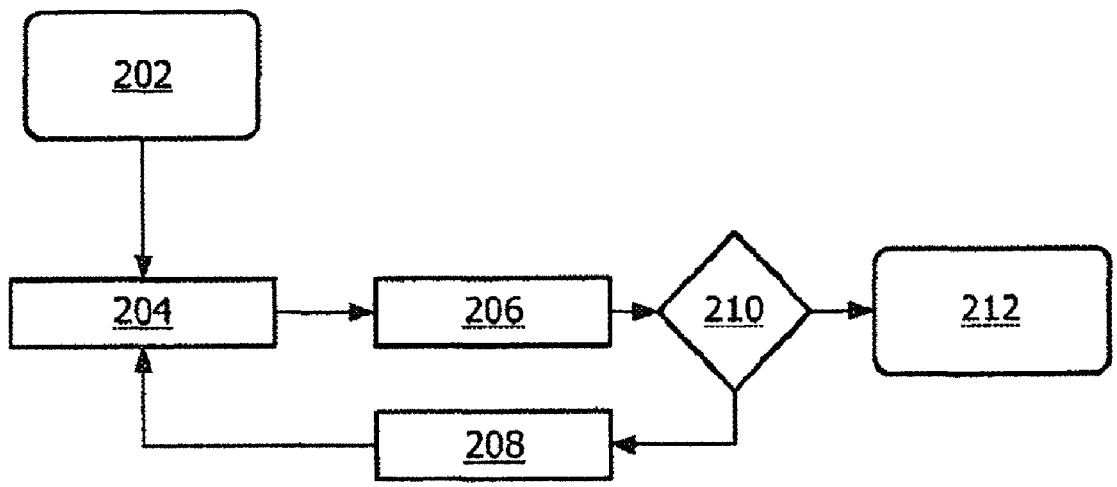
FIG. 2 is a flow chart of a known focus offset calibration routine.
Figure 3:
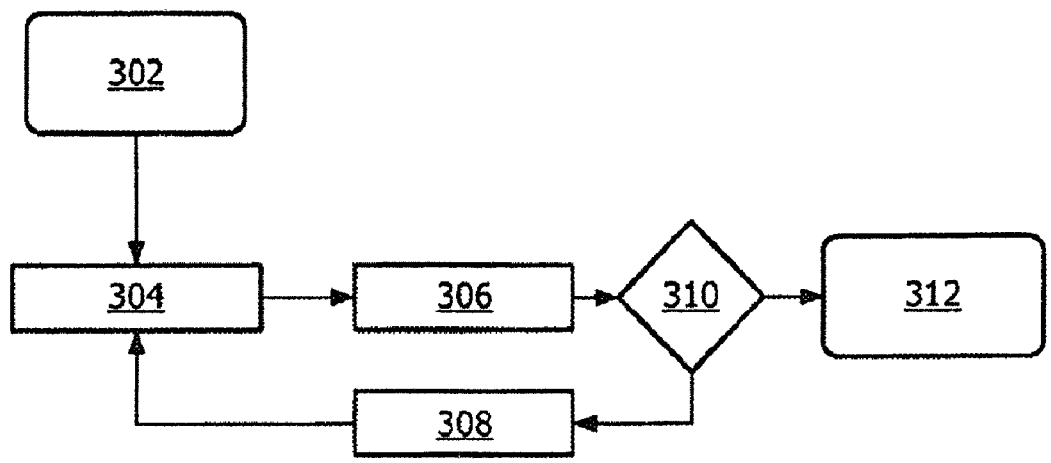
FIG. 3 is a flow chart of a known focus offset calibration routine.
Figure 7:
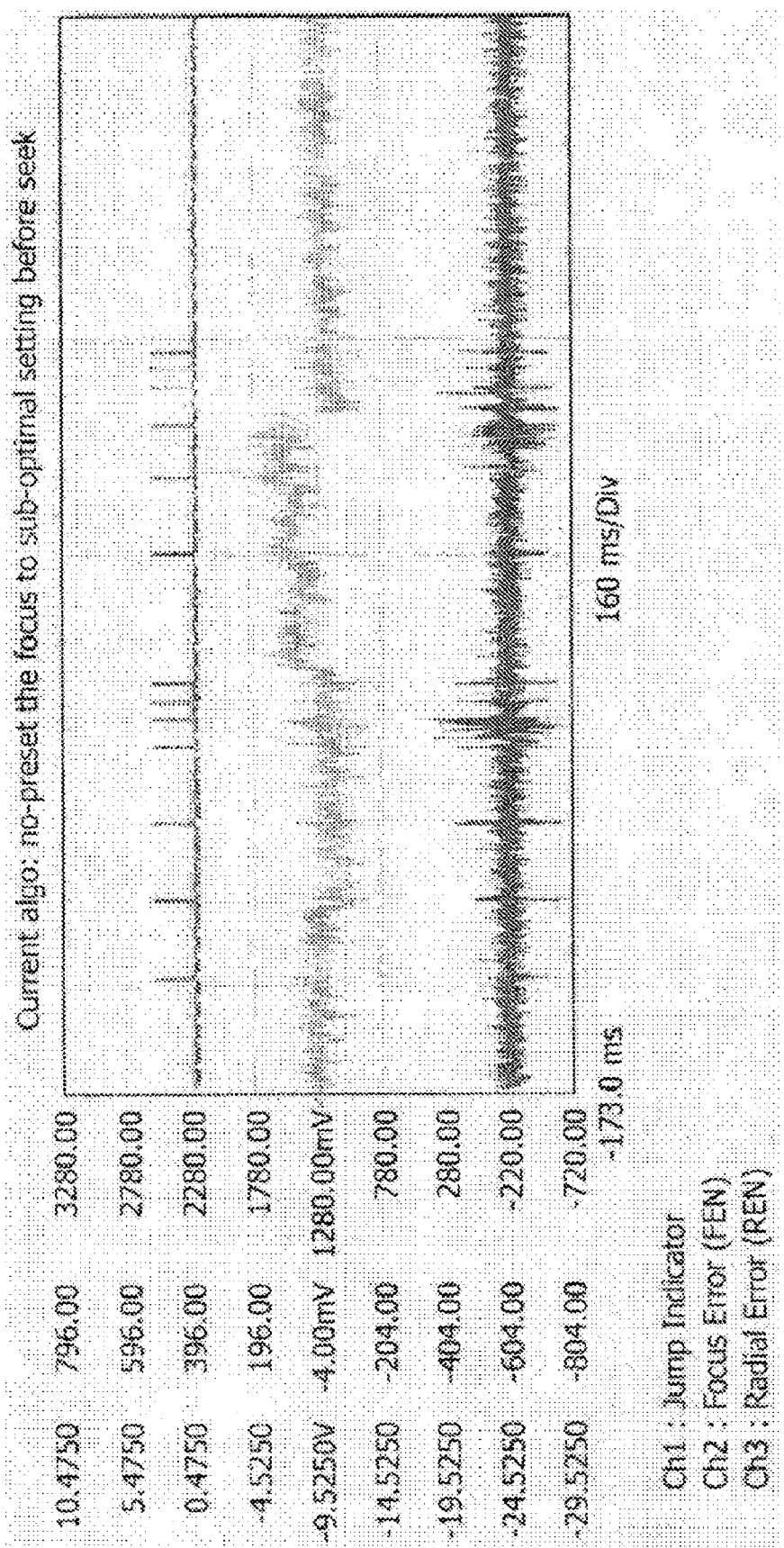
FIG. 7 is a time trace graph showing the focus error and the radial error during the implementation of the known focus optimization routine illustrated in FIG. 2.
Figure 8:
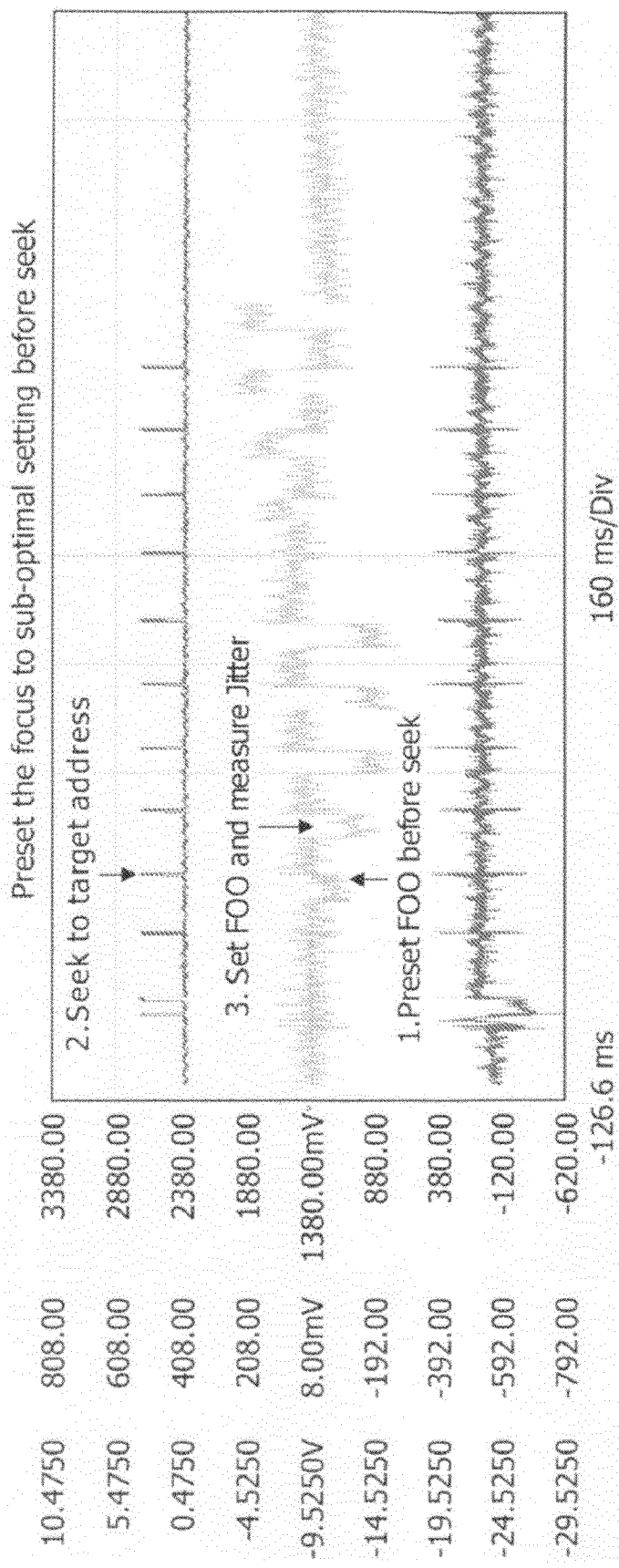
FIG. 8 is a time trace graph showing the focus error and the radial error during the implementation of the improved focus optimization routine according to one embodiment of the invention.

The advantages of the improved focus calibration routine can be observed by comparing FIGS. 7 and 8. FIG. 7 is a time trace which shows a jump indicator on channel 1, the focus error on channel 2 and a radial error on channel 3 for an optical disc system implementing the known focus calibration routine illustrated in FIG. 2. After each jump, the radial error distortion becomes greater to the point where radial track loss occurs. On the other hand as illustrated in FIG. 8, the improved focus calibration routine of the present invention results in no visible radial tracking distortion. As a result, by using the improved focus calibration routine of the present invention, measurements can be made over a much wider range of focus offset values making the focus calibration more accurate without a lot of radial recoveries.

Figure 9:
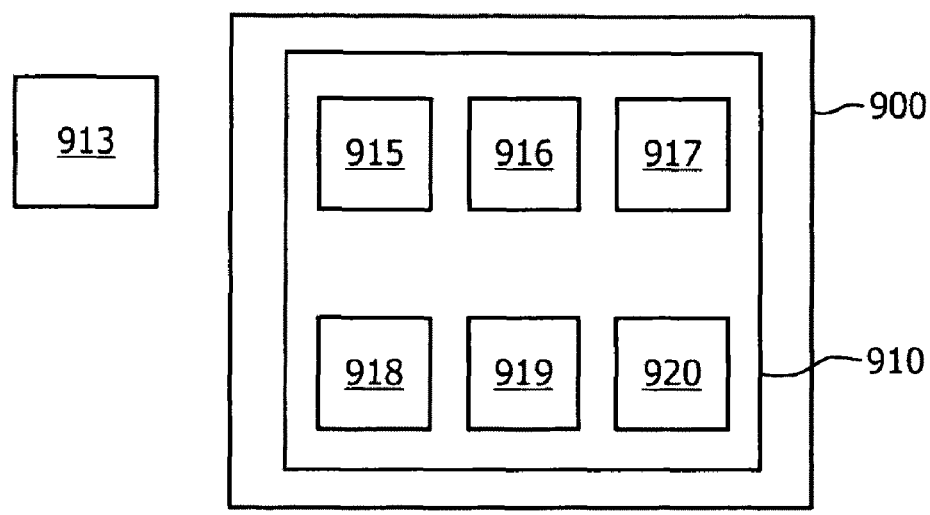
FIG. 9 is a computer readable medium according to one embodiment of the invention.

In another embodiment of the invention according to FIG. 9, a computer-readable medium is illustrated schematically. A computer-readable medium 900 has embodied thereon a computer program 910 for processing by a computer 913, the computer program comprising code segments for increasing a dynamic voltage swing in an actuator system. The computer program comprises a code segment 915 setting focus offset of a recording unit to a first of a plurality of predetermined values; a code segment 916 for measuring and storing a HF quality value for the selected focus offset value of the recording unit; a code segment 917 for setting focus offset to a best-known focus offset value; a code segment 918 for jumping tracks on the optical media being read; a code segment 919 for repeating the above steps for each of said plurality of predetermined focus offset values; and a code segment 920 for determining optimal focus setting from said stored HF quality measurements.

The invention can be implemented in any suitable form including hardware, software, firmware or any combination of these. The invention may be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different systems than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for obtaining focus optimization in an optical disc system, comprising:
   a) setting focus offset of a recording unit to a first of a plurality of predetermined values;
   b) measuring and storing a HF (high frequency) quality value for the selected focus offset value of the recording unit;
   c) setting focus offset to a best-known focus offset value;
   d) jumping tracks on the optical media being read to measure the HF quality value;
   e) setting the focus offset value to a next selected focus offset value of the plurality of predetermined focus offset values;
   f) repeating the above steps b) to e) for each of said plurality of predetermined focus offset values; and
   g) determining optimal focus setting from said stored HF quality measurements,
   wherein step e) sets the next selected focus offset value in a decreasing direction until the measured HF quality value reaches a predetermined value and then sets the next selected focus offset value in an increasing direction until the measured HF quality value reaches the predetermined value.

2. The method according to claim 1, wherein the HF quality measurement is jitter.

3. The method according to claim 1, wherein the HF quality measurement is bit error rate.

4. The method according to claim 1, wherein the HF quality measurement is byte error rate.

5. The method according to claim 1, wherein the HF quality measurement is a PRML sample amplitude modulation.

6. The method according to claim 1, wherein the best-known focus offset values may change after each HF quality measurement.

7. The method according to claim 6, wherein the best-known focus offset values are determined by a control system in the optical disc system from previous optimization routines.

8. The method according to claim 7, wherein the best-known focus offset values are stored in the control system.

9. The method according to claim 6, wherein the best-known focus offset values are determined using a second type of focus calibration routines during start-up of the optical disc system.

10. The method according to claim 9, wherein the focus calibration routine is a push-pull focus calibration routine.

11. The method according to claim 9, wherein the focus calibration routine is a wobble-amplitude measurement routine.

12. The method according to claim 1, wherein the optimal focus setting is determined by plotting a HF quality versus focus offset curve.

13. The method according to claim 1, further comprising the step of:
setting focus offset of the optical disc system to the determined optimal focus setting.

14. The method according to claim 1, further comprising:
storing the determined optimal focus setting in a control system.

15. An optical disc system, comprising:
a recording unit configured to perform an optical scanning operation on an optical medium;
a control system configured to obtain focus optimization for the recording unit, wherein the control system is adapted to perform the following steps:
a) setting a focus offset of the recording unit to a first of a plurality of predetermined values;
b) measuring and storing a HF quality value for the selected focus offset value of the recording unit;
c) setting focus offset to a best-known focus offset value;
d) jumping tracks on the optical medium being read in order to measure the HF quality value;
e) setting the focus offset value to a next selected focus offset value of the plurality of predetermined focus offset values;
f) repeating the above steps b) to e) for each of said plurality of predetermined focus offset values; and
g) determining optimal focus setting from said stored HF quality measurements,
wherein step e) sets the next selected focus offset value in a decreasing direction until the measured HF quality value reaches a predetermined value and then sets the next selected focus offset value in an increasing direction until the measured HF quality value reaches the predetermined value.

16. The system according to claim 15, wherein the HF quality measurement is jitter.

17. The system according to claim 15, wherein the HF quality measurement is bit error rate.

18. The system according to claim 15, wherein the HF quality measurement is byte error rate.

19. The system according to claim 15, wherein the HF quality measurement is a PRML sample amplitude modulation.

20. A non-transitory computer-readable medium having embodied thereon a computer program for obtaining focus optimization in an optical disc system, for processing by a computer, the computer program comprising:
a) a first code segment for setting focus offset of a recording unit to a first of a plurality of predetermined values;
b) a second code segment for measuring and storing a HF quality value for the selected focus offset value of the recording unit;
c) a third code segment for setting focus offset to a best-known focus offset value;
d) a fourth code segment for jumping tracks on the optical media being read in order to measure the HF quality value;
e) a fifth code segment for setting the focus offset value to a next selected focus offset value of the plurality of predetermined focus offset values;
f) a sixth code segment for repeating the above steps b) to e) for each of said plurality of predetermined focus offset values; and
g) a seventh code segment for determining optimal focus setting from said stored HF quality measurements,
wherein step e) sets the next selected focus offset value in a decreasing direction until the measured HF quality value reaches a predetermined value and then sets the next selected focus offset value in an increasing direction until the measured HF quality value reaches the predetermined value.

* * * * *